United States Patent
Gebraad

(10) Patent No.: US 11,994,109 B2
(45) Date of Patent: May 28, 2024

(54) ESTIMATING FREE-STREAM INFLOW AT A WIND TURBINE

(71) Applicant: Siemens Gamesa Renewable Energy A/S, Brande (DK)

(72) Inventor: Pieter M. O. Gebraad, Copenhagen (DK)

(73) Assignee: SIEMENS GAMESA RENEWABLE ENERGY A/S, Brande (DK)

(*) Notice: Subject to any disclaimer, the term of this patent is extended or adjusted under 35 U.S.C. 154(b) by 944 days.

(21) Appl. No.: 16/975,166

(22) PCT Filed: Feb. 15, 2019

(86) PCT No.: PCT/EP2019/053780
§ 371 (c)(1),
(2) Date: Aug. 24, 2020

(87) PCT Pub. No.: WO2019/166236
PCT Pub. Date: Sep. 6, 2019

(65) Prior Publication Data
US 2021/0115900 A1    Apr. 22, 2021

(30) Foreign Application Priority Data

Feb. 28, 2018  (EP) .................................. 18159160

(51) Int. Cl.
*F03D 7/04*  (2006.01)
*F03D 17/00*  (2016.01)
*G01M 9/06*  (2006.01)

(52) U.S. Cl.
CPC ............. *F03D 7/048* (2013.01); *F03D 17/00* (2016.05); *G01M 9/065* (2013.01);
(Continued)

(58) Field of Classification Search
CPC ........ F03D 7/048; F03D 17/00; G01M 9/065; F05B 2260/821; F05B 2270/204; F05B 2270/32; F05B 2270/321; Y02E 10/72
See application file for complete search history.

(56) References Cited

U.S. PATENT DOCUMENTS 7,518,257 B2    4/2009  Guey
9,512,820 B2   12/2016  Obrecht
(Continued)

FOREIGN PATENT DOCUMENTS

CN    101413483 A    4/2009
CN    102945318 A    2/2013
(Continued)

OTHER PUBLICATIONS

Machefaux, E., Larsen, G. C., Troldborg, N., Gaunaa, M., and Rettenmeier, A. (2015) Empirical modeling of single-wake advection and expansion using full-scale pulsed lidar-based measurements. Wind Energ., 18: 2085-2103. doi: 10.1002/we.1805 (Year: 2015).*

(Continued)

*Primary Examiner* — Steven W Crabb
(74) *Attorney, Agent, or Firm* — Schmeiser, Olsen & Watts LLP

(57) ABSTRACT

Provide is a method of estimating free-stream inflow at a downstream wind turbine of a wind park, the method including: selecting, from plural candidate wind turbines previously defined specifically for the downstream wind turbine, an upstream wind turbine based on a currently determined wind direction; using determination equipment of the selected upstream wind turbine to determine the free-stream inflow.

14 Claims, 6 Drawing Sheets

Figure 1:
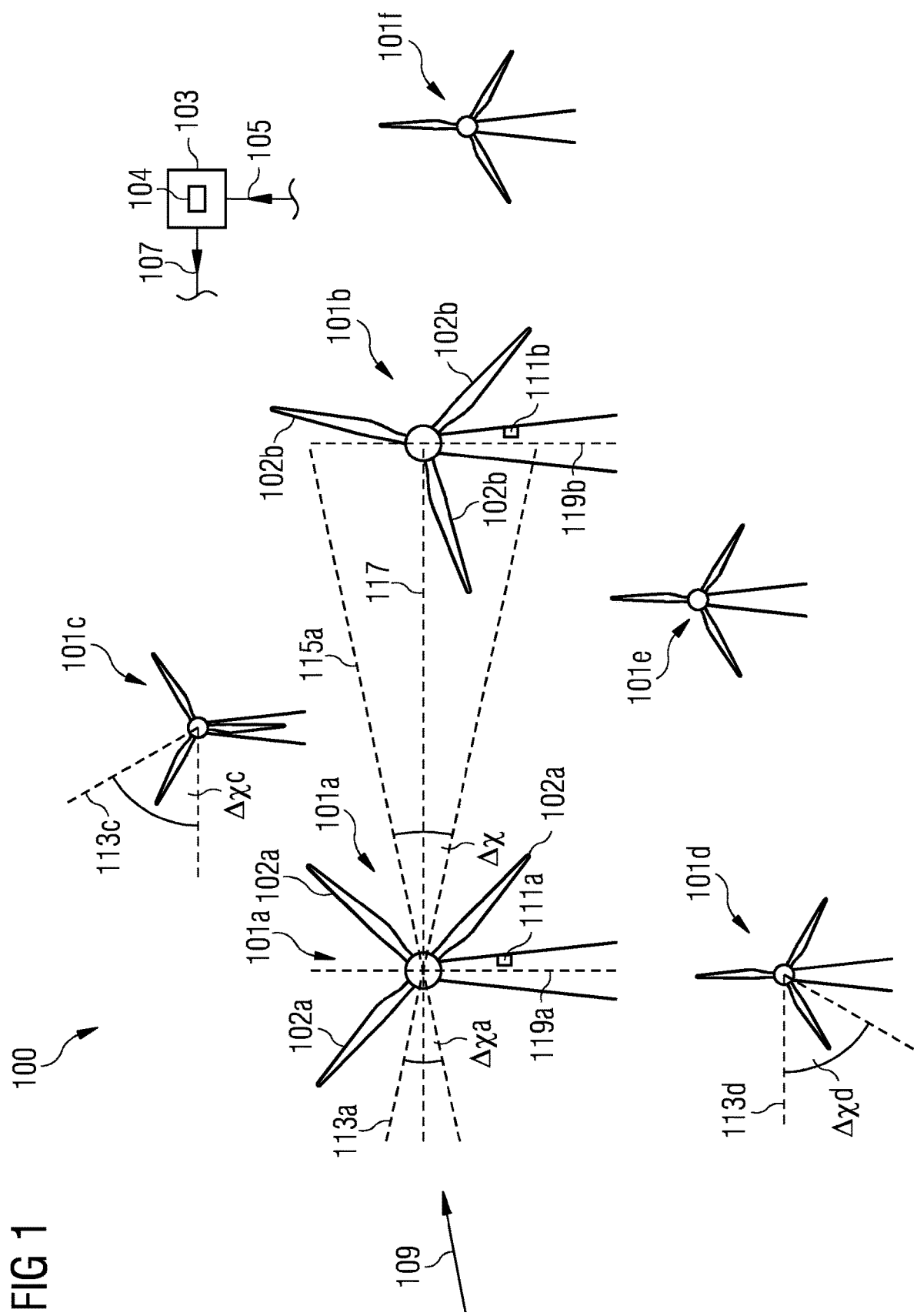

(52) U.S. Cl.
CPC ... *F05B 2260/821* (2013.01); *F05B 2270/204* (2020.08); *F05B 2270/32* (2013.01); *F05B 2270/321* (2013.01)

(56) References Cited

U.S. PATENT DOCUMENTS

| | | |
|---|---|---|
| 2009/0099702 A1 | 4/2009 | Vyas et al. |
| 2013/0103202 A1 | 4/2013 | Bowyer et al. |
| 2013/0166082 A1 | 6/2013 | Ambekar et al. |
| 2017/0284368 A1* | 10/2017 | Franke ................ F03D 7/0292 |
| 2017/0335827 A1 | 11/2017 | Wilson et al. |
| 2017/0370348 A1* | 12/2017 | Wilson ................ F03D 7/0224 |

FOREIGN PATENT DOCUMENTS

| | | |
|---|---|---|
| CN | 103080540 A | 5/2013 |
| EP | 1 534 951 B1 | 6/2011 |
| EP | 2 667 022 A2 | 11/2013 |
| EP | 2 940 296 A1 | 11/2015 |
| EP | 3771819 A1 | 2/2021 |
| JP | 2019015236 A | 1/2019 |
| WO | 2004011799 A1 | 2/2004 |
| WO | 2019008931 A1 | 1/2019 |

OTHER PUBLICATIONS

Extended European Search Report dated Aug. 24, 2018 for Application No. 18159160.3.
Indian Office Action dated Mar. 8, 2021 for Application No. 202017035252.
International Search Report and Written Opinion dated May 17, 2019 for PCT/EP2019/053780.

* cited by examiner

ESTIMATING FREE-STREAM INFLOW AT A WIND TURBINE

CROSS-REFERENCE TO RELATED APPLICATIONS

This application claims priority to PCT Application No. PCT/EP2019/053780, having a filing date of Feb. 15, 2019, which is based on EP Application No. 18159160.3, having a filing date of Feb. 28, 2018, the entire contents both of which are hereby incorporated by reference.

FIELD OF TECHNOLOGY

The following relates to a method and to an arrangement for estimating free-stream inflow at a downstream wind turbine of a wind park, relates to a method of controlling a downstream wind turbine and/or an upstream wind turbine and further relates to a wind park comprising the arrangement for estimating the free-stream inflow.

BACKGROUND

EP 1 534 951 B1 discloses an assembly of energy flow collectors, such as a wind park and method of operation. Because a wind turbine extracts kinetic energy from the wind, the wind speed will have dropped behind the wind turbine. This effect is often termed the shadow effect or wake effect and the loss that occurs is termed shadow loss or wake loss. The problem of shadow effects gives rise to substantial faults in production. By a correct adjustment of the flows, the fluid speed at the location of the energy-extracting devices in the assembly will increase. Further, the adjusted flow can also function to guide the wake of the energy-extracting devices away which may lead to a further increase in production. When wind turbines are at an angle to the wind, as a result, the wind is deflected from its original direction. Wake can also be guided upwards or downwards to effect to a lesser extent downstream wind turbines.

In order to reduce production losses caused by wind turbine wakes in wind farms, optimized control settings (for example pitch, rotor speed and/or yaw) on the wind turbines can be applied. These optimized settings may most commonly be based on models that assume knowledge of the wind conditions coming into the wind farm (also referred to as free-stream inflow). Thus, the free-stream inflow represents the wind condition (in particular characterized by wind direction, wind speed and/or wind turbulence) which is undisturbed by any wind turbines of the wind park and which impacts the wind park on its periphery and which is also defined within the area of the wind park covered by the wind turbines which would be present if no wind turbine would be present.

Relevant wind conditions for determining the optimized control settings include the free-stream wind direction, speed and turbulence intensity. Based on the relevant wind conditions, the optimized control settings of the individual wind turbines of the wind park may be adjusted in order to optimize power production involving adjusting the wakes, e.g. involving guiding wake regions away from downstream wind turbines to a particular degree by applying yawing offsets to upstream wind turbines Free-stream means that the measured wind conditions shall not be affected by the wake of upstream turbines.

Conventionally, it has been difficult to determine a free-stream inflow at any considered wind turbine, in order to control this considered wind turbine and occasionally also control other upstream wind turbines. Thus, there may be a need for a method and for an arrangement of estimating free-stream inflow at a downstream wind turbine of a wind park, wherein the method can be performed in a fast and reliable manner.

SUMMARY

According to an embodiment of the present invention it is provided a method of estimating free-stream inflow at a downstream wind turbine of a wind park, the method comprising: selecting, from plural candidate wind turbines previously defined specifically for the downstream wind turbine, an upstream wind turbine based on a currently determined wind direction; and using determination equipment of (or at or close to) the selected upstream wind turbine to determine the free-stream inflow.

The free-stream inflow may comprise a characterization or definition of wind condition unaffected by any wind turbine (for example involving definition of wind speed, wind direction and/or wind turbulence) at a position of the downstream wind turbine. The free-stream inflow may characterize the wind conditions at the position of the downstream wind turbine which would be present if no other wind turbine would be present, in particular if no upstream wind turbines would be present. Based on the free-stream inflow, the actual wind condition (taking into account wind condition changes caused by other, in particular upstream turbine(s)), and a potential improved wind condition with optimized control settings, can appropriately be derived (in particular computed, calculated) using a physical mathematical model, such as a wake model.

A wake model is for example described in the publication "Wind plant power optimization through yaw control using a parametric model for wake effects—a CFD simulation study" by Gebraad et al., Wind Energy, 2014. Therein, an iterative procedure is proposed to find the front turbine in the flow, in order to take the free-stream flow measurements from that turbine. The proposed method is however not robust to measurement errors and may require a lot of communication between the wind turbines which might be problematic in large wind farms with many wind turbines.

According to an embodiment of the present invention, the downstream wind turbine may be any internal (for example non-peripheral, not arranged at a border of the wind farm) wind turbine in the wind park and the method may be applied successively to all internal wind turbines, in order to determine the free-flow inflow for all internal wind turbines. For the peripheral wind turbine, the free-stream inflow may be derived using the determination equipment of the considered peripheral wind turbine directly.

For each of the internal wind turbines (i.e. a particular downstream wind turbine), plural candidate wind turbines may have previously been defined especially for the considered downstream wind turbine. The plural candidate wind turbines may all be peripheral wind turbines, i.e. wind turbines which are on the outer border of the wind park, e.g. wind turbines which surround or encircle all other wind turbines of the wind park. Depending on the currently determined wind direction, one wind turbine from the plural candidate wind turbines is selected and the free-stream inflow is derived using determination equipment of (or associated to or close to) the selected upstream wind turbine. The selected upstream wind turbine is one of the plural candidate wind turbines which may essentially (along the currently determined wind direction) be in front of the considered downstream wind turbine, in particular in a particular angle range such that the downstream wind turbine is located within a cone having a particular opening angle downstream the selected upstream wind turbine.

The determination equipment may comprise a wind measurement system, in particular anemometer and/or computation equipment for estimating wind related characteristics, such as wind speed, wind direction and/or wind turbulence, from operational parameters of the wind turbine. The operational parameters may for example comprise output power of the wind turbine, pitch angle of the wind turbine blades and/or rotational speed of a rotor of the wind turbine from which the wind speed may be estimated or calculated using one or more reference curves. From the output power, the pitching angle and the rotational speed, the effective wind speed may be derived, wherein the effective wind speed then relates to the wind speed of the flow incoming to the wind turbine. The effective wind speed for the peripheral wind turbines is considered to essentially correspond to the wind speed of the free-stream inflow into the wind park.

The wind direction may be measured for example by a sonic sensor and/or by an anemometer. The wind turbulence may for example be calculated based on a variance of the determined wind speed. The selected wind turbine may be configured (e.g. regarding measurement sensor(s)) to provide further characterization of the external conditions, such as air density, pressure, a temperature, humidity and so forth. All the determined parameters of the external conditions may be utilized for controlling the downstream wind turbine and/or the upstream turbine and all other wind turbines in a row downstream the upstream wind turbine up to the downstream wind turbine.

The currently determined wind direction may be obtained in different manners. It may for example be measured by the considered downstream wind turbine initially and may then be measured by the currently selected candidate wind turbine. According to embodiments of the present invention, the wind measurements are selected and corrected from the different wind turbines in the wind farm, to generate the free-stream measurements. These measurements may then be used to schedule the optimal control settings on each turbine in the wind farm to mitigate wake losses.

The predefinition of plural candidate wind turbines specifically (individually) for the considered downstream wind turbine may accelerate the selection of the upstream wind turbine from which the wind characteristic determinations are then utilized for control purposes of the downstream wind turbine and/or other wind turbines of the wind park. The number of the plural candidate wind turbines for the downstream wind turbine may be less than the number of all wind turbines in the wind park. Thus, an extensive and time-consuming search for the appropriate upstream wind turbine may not be necessary.

The association of each downstream wind turbine in the wind park being associated with an individual set of candidate wind turbines may be stored in an electronic storage, for example accessible by a server or wind park controller. The server or wind park controller may be communicatively connected to all wind turbines of the wind park and may supply control signals to individual wind turbine controllers of all wind turbines. In the server or wind park controller, also a wake model algorithm may be executed which may enable to predict wind conditions at each wind turbine based on the free-stream inflow determined by the respective upstream wind turbines which have been selected as explained above. Based on the free-stream inflow, one or more wind turbines of the wind park may for example be controlled regarding the yawing angle to in particular deflect a wake region away from downstream wind turbines and/or concentrate wind flow to downstream wind turbines in order to achieve a maximisation of power production. Also other control settings, such as pitch or rotor speed of the downstream wind turbine may be adjusted based on the free-stream conditions and a wake model, for example to reduce the shadow effect of the wind turbine by pitching out blades and increasing the wind speed in its wake and thereby increase the production of downstream turbines.

According to an embodiment of the present invention, the upstream wind turbine is selected such that it is not, according to the currently determined wind direction, in a wake region of any other wind turbine, wherein in particular the currently determined wind direction is initially determined by the downstream wind turbine and after selecting the candidate wind turbine is determined by the selected candidate wind turbine.

The method may utilize knowledge of the design of the wind park, i.e. knowledge of the positioning of all wind turbines relative to each other. If the wind park has essentially a convex shape of the distribution of positions of the wind turbine, at least one (for which the wind impacts from outside the wind park) of the peripheral wind turbines (surrounding all other wind turbines) will not be in a wake of any other wind turbine in general. If the wind park layout has not a convex shape, geometric considerations allow to determine the upstream wind turbine which is not in the wake region of any other wind turbine of the wind park for a given currently determined wind direction. If the selected upstream wind turbine is not in the wake region of any other wind turbine, the wind characteristic determined by the selected upstream wind turbine may be a reliable estimation of the wind characteristic of the actual free-stream inflow hitting the wind park.

When the method starts, the currently determined wind direction may be the one which is determined by the considered downstream wind turbine. After that, one of the candidate wind turbines (individually associated with the considered downstream wind turbine) will be selected and the currently determined wind direction may be the one which is determined by the selected candidate wind turbine. Thereby, the currently determined wind direction may be more reliable when determined by the selected candidate wind turbine, since this one is not in the wake region of any other wind turbine, thereby more accurately reflecting the true free-stream inflow wind direction.

According to an embodiment of the present invention to each of the candidate wind turbines a wind direction angle range is associated such that the downstream turbine is arranged downstream of the candidate wind turbine within a cone corresponding to the wind direction angle range, wherein a candidate is selected for which at least a first criterion is satisfied, comprising: the currently determined wind direction is within the wind direction angle range associated with the selected candidate wind turbine.

The wind direction angle range may for example be between 10 and 45°. The top of the cone may be considered to be at the position of the upstream wind turbine and the cone may have an opening angle being equal to the considered wind direction angle range associated with the considered candidate wind turbine. If the currently determined wind direction is within the wind direction angle range associated with the selected candidate wind turbine, the considered downstream wind turbine may to a high probability be impacted by the wind measured at the upstream turbine and/or affected by a wake effect caused by the upstream wind turbine. Further, the wind characteristic as determined at the site of the selected upstream wind turbine may accurately reflect the wind condition which will be present at the considered downstream wind turbine, since the downstream wind turbine is essentially in the flow direction downstream the selected upstream wind turbine. Thereby, the accuracy of the free-stream inflow applied to the downstream wind turbine may be improved.

According to an embodiment of the present invention, that candidate wind turbine is selected, if further at least a second criterion is satisfied, comprising: the selected candidate wind turbine is closer to the downstream wind turbine than all other candidate wind turbines satisfying the first criterion.

If the selected candidate wind turbine is relatively close to the downstream wind turbine, the wind characteristic, in particular the free-stream inflow is believed to be very similar at the position of the selected upstream similar as at the position of the downstream wind turbine. If the selected candidate wind turbine is too far away, the wind conditions may have changed considerably.

The correlation between the wind condition at an upstream turbine and a downstream turbine may be improved by correcting the measured wind free-stream conditions with a time delay. This time delay may be calculated from the wind speed and the distance between the upstream and the downstream turbine.

According to an embodiment of the present invention, a union of all wind direction angle ranges cover 360°, wherein at least two wind direction angle ranges overlap, in particular having an overlap of 5° to 20°. If the wind direction angle ranges together cover 360°, then for every currently determined wind direction, a candidate wind turbine may be selected such that the method is applicable for all possible wind directions. In other embodiments, no two wind direction angle ranges overlap with each other. If at least two wind direction angle ranges overlap or if in particular each two adjacent wind direction angle ranges overlap with each other, a particular hysteresis is provided which may reduce a fast switching between selected upstream wind turbines.

By associating the particular wind direction angle range to each of the candidate wind turbine, the method may be implemented in a very effective manner, allowing a fast selection of the appropriate upstream wind turbine.

According to an embodiment of the present invention, the method further comprises determining a wind direction by the selected candidate wind turbine; checking the first criterion now applied to the wind direction determined by the selected wind turbine as the currently determined wind direction. The wind direction as determined by the selected candidate wind turbine may be different from the wind direction initially determined by the considered downstream wind turbine. Therefore, a check may be necessary whether the first criterion is still satisfied, wherein the first criterion is now applied to the wind direction determined by the selected wind turbine as the currently determined wind direction.

According to an embodiment of the present invention, the method further comprises, if the first criterion is not satisfied for the selected candidate wind turbine: selecting another upstream wind turbine from the plural candidate wind turbines for which the first criterion, and in particular also the second criterion, is satisfied.

In particular, the method may continuously perform checking whether the currently selected candidate wind turbine satisfies the first criterion and in particular also the second criterion and another upstream wind turbine is selected if the first criterion and/or the second criterion are not satisfied. In particular, as has been mentioned before, the method may be successively performed for all downstream wind turbines of the wind park, essentially for all internally located wind turbine of the wind park.

According to an embodiment of the present invention, the candidate wind turbines are peripheral wind turbines of the wind park, wherein the selected candidate wind turbine is in particular located in an angle range in front of the downstream wind turbine along the wind direction. The peripheral wind turbines may essentially surround all other wind turbines of the wind park and may be located at the border of the wind park thereby providing the most reliable free-stream inflow measurements or estimations.

According to an embodiment of the present invention, upon a change of the (currently determined) wind direction another wind turbine is selected from the candidate wind turbines, such that at least the first criterion satisfied. Whenever there is a change in the currently determined (or actual) wind direction, another wind turbine may be selected from the candidate wind turbines for the considered downstream wind turbine such that at least the first criterion and further also the second criterion is satisfied. Thereby, the method may support quickly changing wind conditions, in particular wind directions.

According to an embodiment of the present invention, if the changed wind direction is within an overlap of two wind direction angle ranges, the previously selected candidate wind turbine is maintained as the selected candidate wind turbine. Thereby, switching in a fast manner between selected wind turbines may be avoided, making the method more robust and in particular avoiding oscillations.

According to an embodiment of the present invention, for at least one of the candidate wind turbines a (e.g. previously defined) primary back-up wind turbine is selected in case the provisionally selected candidate wind turbine does not provide a reliable free-stream inflow determination (e.g. due to loss of communication connection, wind sensor malfunctioning and/or low quality of measurement detected, etc.), the primary back-up wind turbine in particular satisfying less stringent criteria than the candidates to be selected, wherein in particular to at least one candidate wind turbine the wind direction angle range and a back-up wind direction angle range is associated.

Thus, for each of the candidate wind turbines, a back-up or substitute wind turbine may be defined and in particular also for the primary back-up wind turbine, a secondary back-up wind turbine may be previously defined. Thus, in case, that the candidate wind turbine does not function properly for providing the free-stream inflow, it can be switched to the primary back-up wind turbine or the secondary back-up wind turbine or still a further back-up wind turbine until a back-up wind turbine is found which can provide a reliable free-stream inflow.

For example, one or more of the candidate wind turbines may be associated with two or more angle ranges, i.e. a wind direction angle range and a back-up wind direction angle range or further secondary or other back-up wind direction angle ranges.

According to an embodiment of the present invention it is provided a method of controlling a downstream wind turbine and/or an upstream wind turbine, the method comprising: performing a method according to one of the preceding embodiments; and controlling, in particular regarding yawing, adjusting the blade pitch, and/or rotor speed of the downstream wind turbines and/or the upstream wind turbine based on the free-stream inflow.

In particular, the upstream wind turbine may be controlled regarding the yawing, in order to deflect a wake region away from the downstream wind turbine. Also, the downstream wind turbine may be controlled regarding yawing, in particular setting a yawing offset (being a difference between the predicted wind direction and the direction of the rotation axis of the rotor of the downstream wind turbine). In particular, the considered downstream wind turbine may represent an upstream wind turbine for a further downstream located wind turbine. Thus, the downstream wind turbine may also be controlled regarding the yawing such as to deflect a wake region away from further downstream located wind turbine, for example. Also, the upstream wind turbine may be controlled to reduce its thrust, by adjusting pitch and/or rotor speed, and thereby its impact on a downstream turbine through its wake. The controlling (e.g. regarding yawing) may apply to all wind turbines in a row (or) cone around the wind direction (in particular except the most downstream wind turbine).

According to an embodiment of the present invention, controlling the downstream wind turbine includes: predicting, in particular using a wake model, a wind condition at the downstream wind turbine based on the free-stream flow and operation conditions of all other wind turbines in front of the downstream wind turbine; and controlling the downstream wind turbine based on the predicted wind condition at the downstream wind turbine.

The wake model may take into account the upstream wind turbine(s) and further wind turbines in between the upstream wind turbine and the downstream wind turbine which may all contribute to changing the wind condition at the considered downstream wind turbine. The wake model may take into account the layout of the wind park, for example definition of the positioning of all wind turbines, may take into account individual yawing angles or yawing offsets as set at the different wind turbines, and may take into account the thrust exerted by each wind turbine on the flow as a function of its control settings (for example yaw, pitch and/or rotor speed), and/or may take into account the free-stream inflow for every position of every wind turbine. The downstream wind turbine may for example be controlled regarding its yawing offset, its pitching angles, its rotational speed, regarding power output and so forth.

It should be understood that features individually or in any combination disclosed in the context of a method of estimating free-stream inflow at a downstream wind turbine may also be applied, individually or in any combination, to an arrangement for estimating free-stream inflow at a downstream wind turbine according to embodiments of the present invention and vice versa.

According to an embodiment of the present invention it is provided an arrangement for estimating free-stream inflow at a downstream wind turbine of a wind park, the arrangement comprising: a selection module adapted to select, from plural candidate wind turbines previously defined specifically for the downstream wind turbine, an upstream wind turbine based on a currently determined wind direction; and determination equipment of the selected upstream wind turbine adapted to determine the free-stream inflow.

The arrangement may be part of a wind park controller and/or may be implemented partly in hardware and/or software, for example involving a server which is within a communication network connected to all wind turbines. All wind turbines may communicate their operational conditions and/or may communicate measurement signals to the wind park controller or wind park server. The wind park server may have knowledge of the layout of the wind park and may keep associations between each of the wind turbines of the wind park with the corresponding candidate wind turbines including the association of each candidate wind turbine with a particular wind direction angle range (specific for the considered downstream wind turbine).

According to an embodiment of the present invention it is provided a wind park, comprising: plural wind turbines; and an arrangement according to the preceding embodiment communicatively connected with the wind turbines, in particular adapted to perform a method according to one of the preceding embodiments for each non-peripheral wind turbine of the wind park as the downstream wind turbine.

The aspects defined above and further aspects of embodiments of the present invention are apparent from the examples of embodiment to be described hereinafter and are explained with reference to the examples of embodiment. Embodiments of the invention will be described in more detail hereinafter with reference to examples of embodiment but to which embodiments of the invention is not limited.

BRIEF DESCRIPTION

Figure 2:
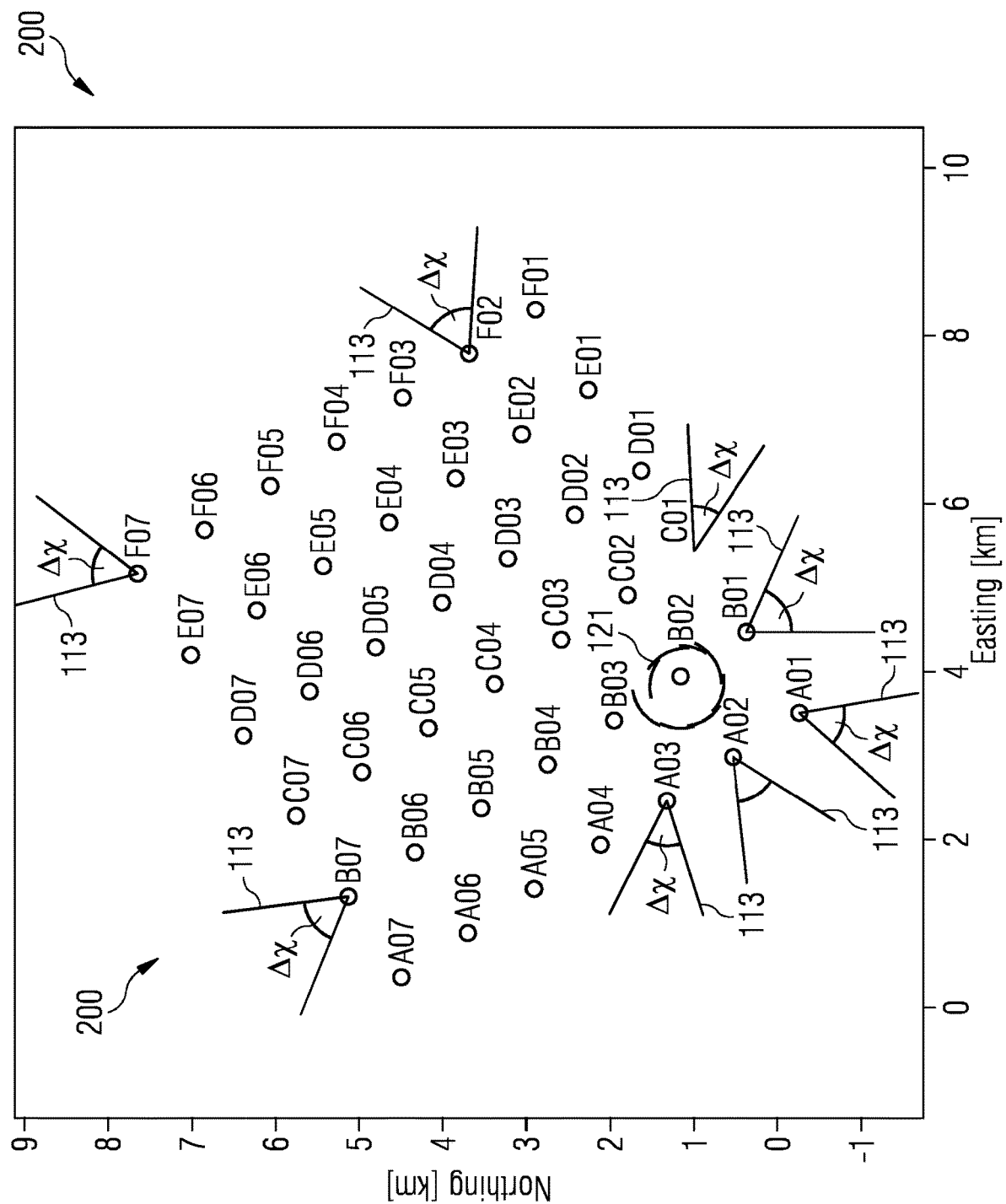
Figure 3:
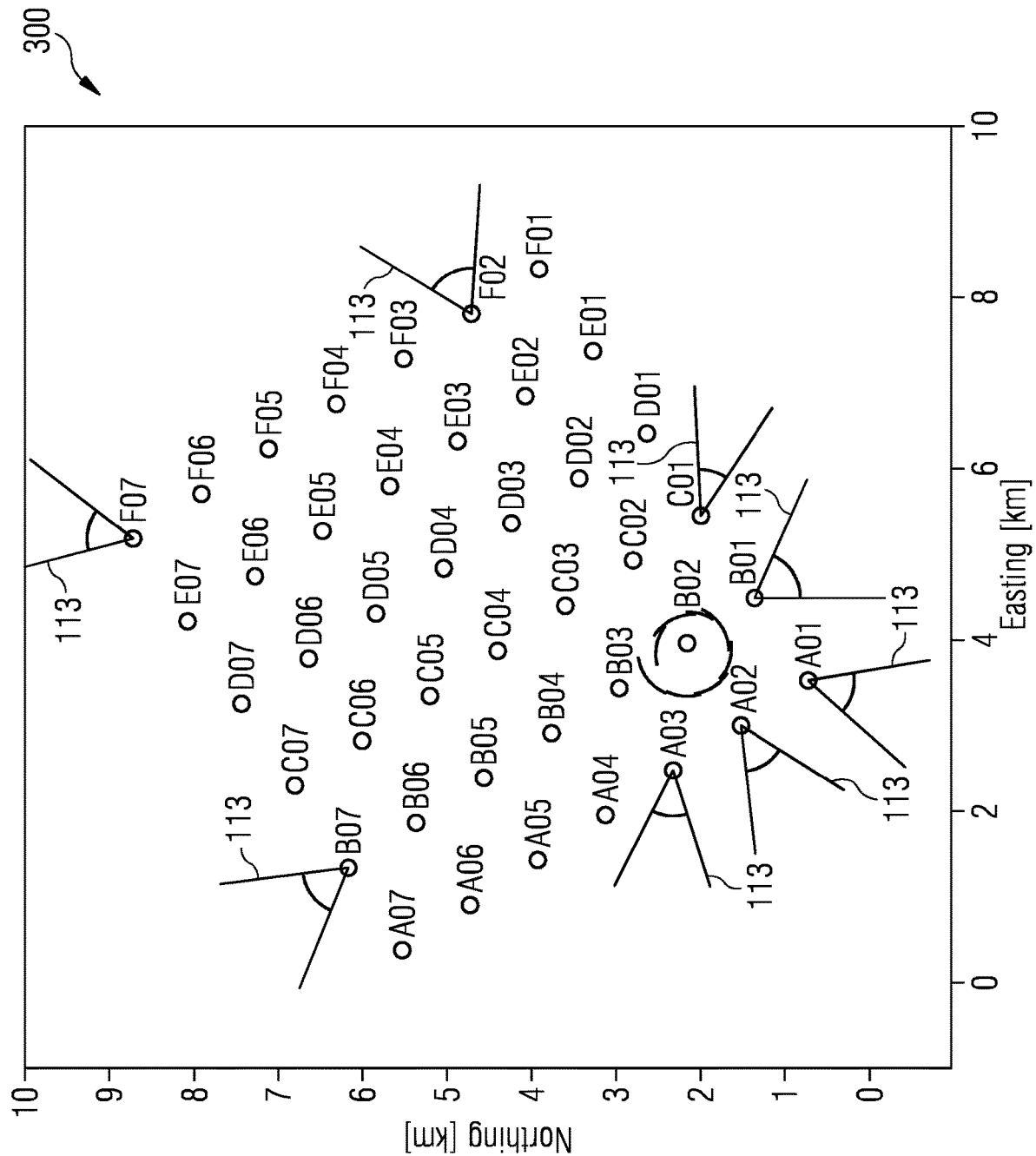
Figure 4:
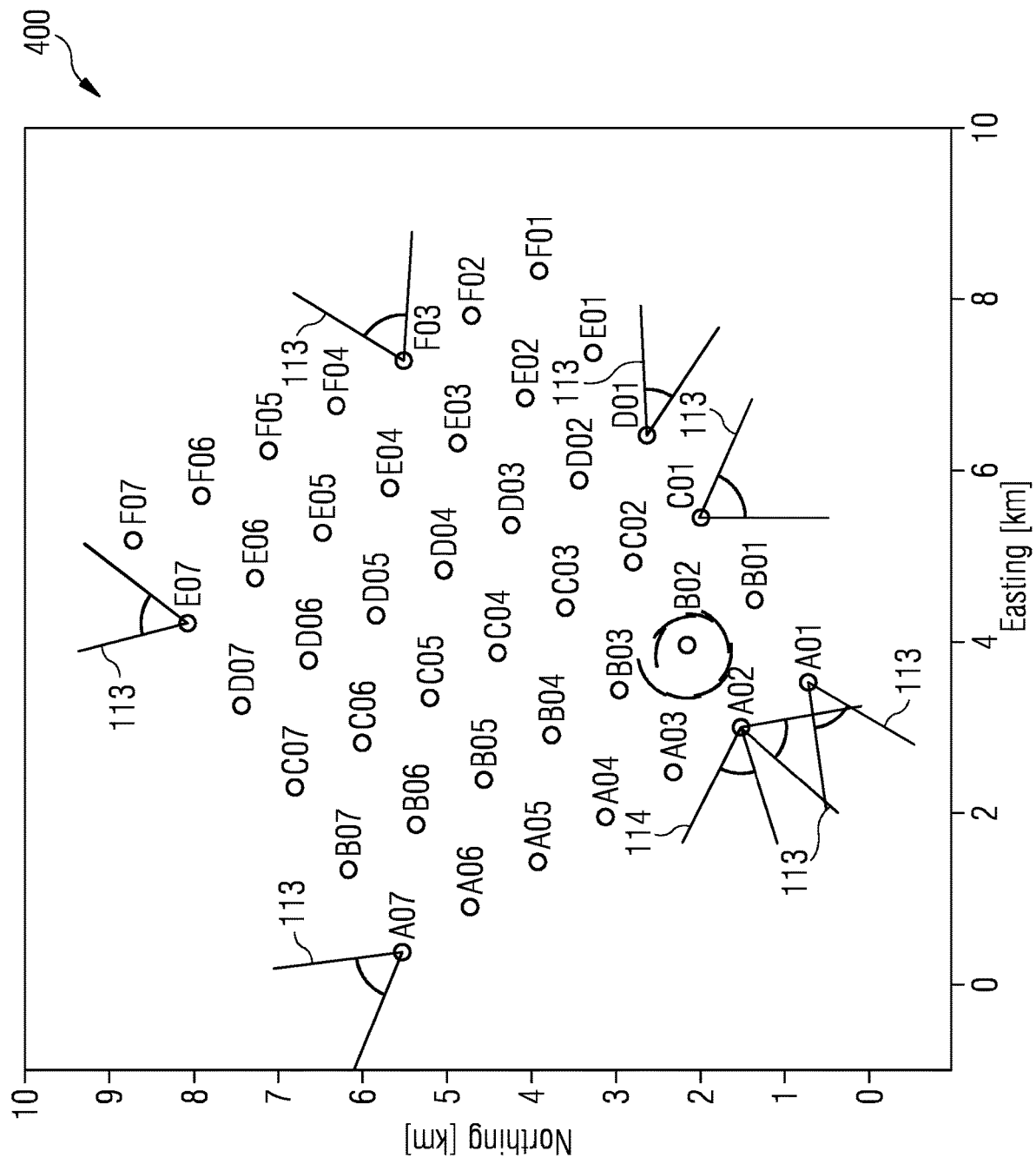
Figure 5:
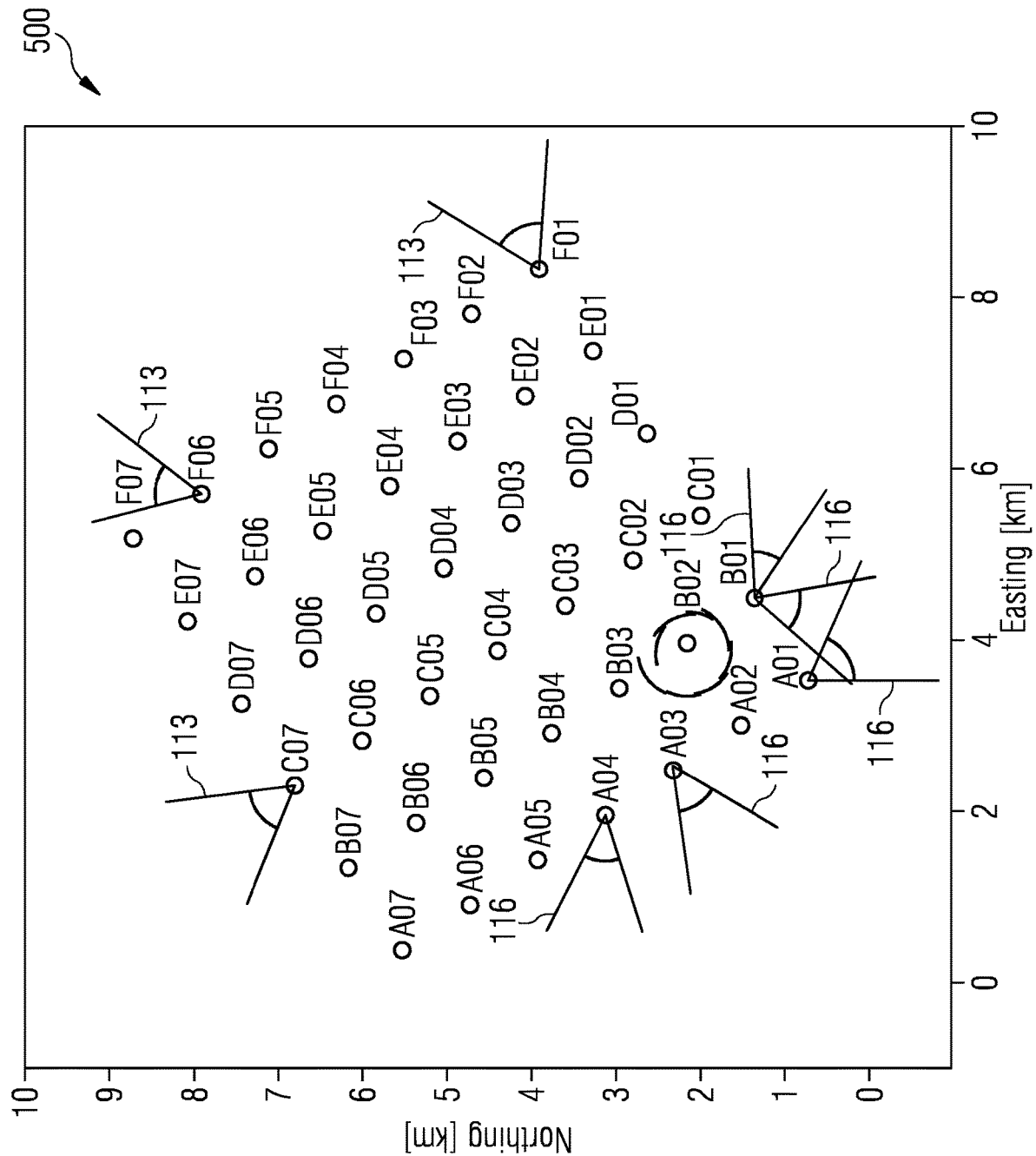
Figure 6:
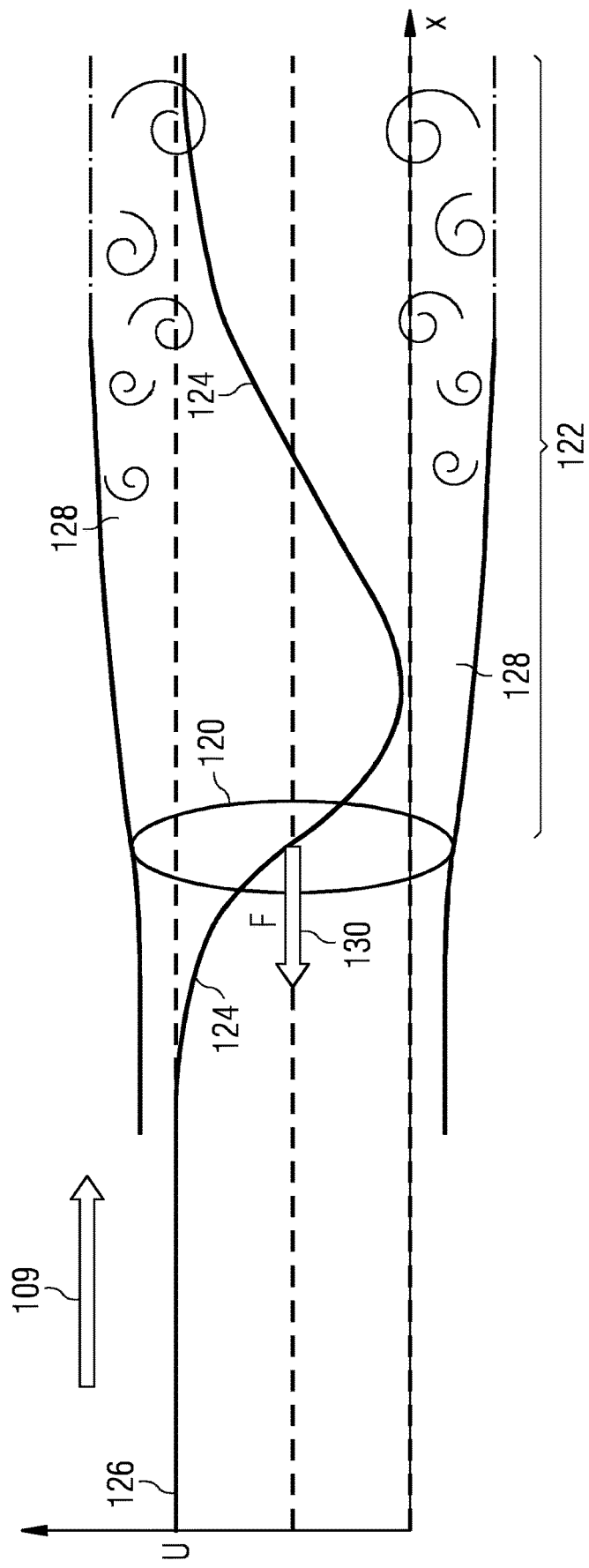

Some of the embodiments will be described in detail, with reference to the following figures, wherein like designations denote like members, wherein:

FIG. 1 schematically illustrates a wind park according to an embodiment of the present invention;

FIG. 2 schematically illustrates a wind park according to an embodiment of the present invention;

FIG. 3, schematically illustrate candidate wind turbines and primary and secondary back-up candidate wind turbines as defined according to an embodiment of the present invention;

FIG. 4 schematically illustrate candidate wind turbines and primary and secondary back-up candidate wind turbines as defined according to an embodiment of the present invention;

FIG. 5 schematically illustrate candidate wind turbines and primary and secondary back-up candidate wind turbines as defined according to an embodiment of the present invention; and FIG. 6 illustrates exemplary wind conditions around a wind turbine.

DETAILED DESCRIPTION

The illustration in the drawings is in schematic form. It is noted that in different figures, similar or identical elements are provided with the same reference signs or with reference signs, which are different from the corresponding reference signs only within the first digit.

The wind park 100 according to an embodiment of the present invention illustrated schematically in FIG. 1 comprises plural wind turbines 101a, 101b, 101c, 101d, 101e and 101f as well as an arrangement 103 for estimating free-stream inflow at a downstream wind turbine according to an embodiment of the present invention. Each wind turbine 101a, 101b, 101c, 101d, 101e and 101f has each respective rotor blades e.g. 102a, 102b rotating in a disk plane upon impact of wind. The arrangement 103 is communicatively connected to all wind turbines capable of (bi)directional communication in particular receiving from all wind turbines operational and measurement signals 105 and supplying to the wind turbines control signals 107.

Thereby, the arrangement 103 is configured for carrying out a method of estimating free-stream inflow at a downstream wind turbine of a wind park according to an embodiment of the present invention. Therefore, the arrangement 103 has, for each downstream wind turbine 101b, previously defined plural candidate wind turbines (from which not all are illustrated in FIG. 1) shown as 101a, 101c, 101d.

Based on a currently determined wind direction 109, from the candidate wind turbines, an upstream wind turbine 101a is selected for the downstream wind turbine 101b, in order to use determination equipment 111a of the selected upstream wind turbine 101a to determine the free-stream inflow as would be experienced by the considered downstream wind turbine 101b if no other wind turbine is along the wind direction 109 in front of the considered downstream wind turbine 101b.

Thereby, the wind turbines 101a, 101c and 101d represent the candidate wind turbines which have previously been defined for the considered downstream wind turbine 101b. As can be appreciated from FIG. 1, the selected candidate wind turbine 101a is, according to the currently determined wind direction 109, not in a wake region of any other wind turbine of the wind park 100. The currently determined wind direction 109 may have been determined by determination equipment 111b of the considered downstream wind turbine 101b. To the selected wind turbine 101a as well as to all other candidate wind turbines 101a, 101c and 101d previously defined for the considered downstream wind turbine 101b, a corresponding wind direction angle range 113a, 113c and 113d is associated which may have an extension of for example 10 to 45°. The extension is indicated with Δλ. The extension Δχ is in fact in the horizontal direction (in a plan view as in FIG. 2 to 5), shown in FIG. 1 only for illustrative reasons as if on the vertical direction. The extension Δχ may equal or different for different wind turbines, e.g. smaller at higher density of turbines. Each wind turbine comprises rotor blades which rotate around a not illustrated rotation axis and which are mounted at a hub of the rotation axis.

The candidate wind turbines 101a, 101c, 101d are all (in particular a subset of) peripheral wind turbines forming a boundary of the wind park 100 and substantially surrounding all other wind turbines of the wind park 100. The considered downstream wind turbine 101b is located downstream of the selected candidate wind turbine 101a within a cone 115a whose top is located at the hub of the selected candidate wind turbine 101a and which is oriented to have a central axis 117 to be collinear with the central axis of the wind direction angle range 113a.

As can be taken from FIG. 1, the currently determined wind direction 109 is within the wind direction angle range 113a of the selected candidate wind turbine 101a but not within the wind direction angle ranges 113c, 113d of the other candidate wind turbines 101c, 101d. Furthermore, the selected wind turbine 101a is relatively close to the considered downstream wind turbine 101b such that no other candidate (or peripheral) wind turbine is in front of the considered downstream wind turbine 101b and closer to the considered downstream wind turbine 101b.

If the currently determined wind direction 109 would be different from the direction as indicated in FIG. 1, another one of the candidate wind turbines other than the wind turbine 101a may be selected in order to provide free-stream inflow information with respect to the downstream wind turbine 101b.

The operational and measurement signals 105 may therefore include information regarding free-stream inflow as determined by the determination equipment 111a of the selected candidate wind turbine 101a. Based on the free-stream inflow information received by the arrangement 103, the arrangement 103 computes control signals 107 to control the upstream wind turbine 101a and/or the downstream wind turbine 101b, in particular regarding yawing the wind turbine which involves rotating the wind turbines (in particular nacelles) around a vertical axis 119a, 119b, respectively, and/or changing pitch angle and/or changing power output and/or changing or controlling rotational speed and the like. For the selection, the arrangement 103 comprises a selection module 104.

Purpose of functionality according to embodiments of the present invention may be to ensure that the wind condition measurements that are used at each turbine to determine the optimal control settings for wake, are measured at a turbine in the wind farm which may comprise one or more of the following criteria:

1. It is not in the wake of another wind turbine at the time of measurement, i.e. it is a measurement of the free-stream flow.
2. It is relatively close to the yaw-offset-controlled turbine (i.e. the downstream turbine 101b), in a cross-flow and along the flow direction, such that the measured free-stream flow is representative of what the yaw controlled turbine (wind turbine 101b) would have as inflow if it would not be wake, impacted.

For this purpose, based on the layout of the wind farm, for each yaw-offset-controlled wind turbine in the wind farm, a group of possible candidate turbines can be defined, from which to receive measurements of the free-stream wind conditions. Each of the turbines in this "reference group" (also referred to as candidates) may have a certain wind direction range, such as ranges 113a,c,d, . . . , (or sector) in which its wind direction and speed measurements can be used as a valid free-stream flow measurement that may fulfil the above requirements.

FIG. 2 schematically illustrates an example of the definition of the reference group (also referred to as candidates) and its sectors (wind direction angle ranges). In FIG. 2, the reference group of wind turbines (or candidate wind turbines) comprise the wind turbines A03, A02, A01, B01, C01, F02, F07 and B07 as indicated which are candidate wind turbines of the considered downstream wind turbine B02. The considered downstream wind turbine B02 of the wind park 200 illustrated in FIG. 2 will utilize the measurements of the free-stream wind direction, speed and turbulence from a candidate wind turbine which is selected based on the currently determined wind direction. Thereby, the sectors or wind direction angle ranges are indicated with reference sign 113. Whenever the determined wind direction is within a wind direction angle range of a particular candidate wind turbine, that candidate wind turbine is selected and a wind measurement or wind determination derived from this selected wind turbine is used for deriving the free-stream inflow for the considered downstream wind turbine B02. As has been mentioned, each of the candidate wind turbines has a certain wind direction range (sector) 113, indicated in which its wind direction and speed measurements can be used by a yaw-controlled turbine B02 as the free-stream flow measurements. When the reference turbine (i.e. the selected candidate turbine) needs to be changed (for example the wind direction is out of the sector of the reference turbine), the free-stream flow measurement may be switched to being taken at a new reference turbine by checking which sector corresponds to the wind direction.

In order to prevent jumps in the free-stream flow measurement signals, a rate-off-change limitation of the measurement signals may be applied.

Each of the wind direction angle ranges (i.e. each sector) 113 may be chosen such that wake interference may be avoided. There may a margin (in this case of at least 30°) between a sector boundary and the alignment angle with another turbine. The combination of the sectors may cover the full 360° range of wind directions, as illustrated with the encirclement 121 of the turbine B02.

By using a small overlap of the sectors, some hysteresis may be used when switching between reference turbines, in which the turbine will not change reference turbine as long as it is within the sector of that reference turbine. This may prevent rapid back and forth switching between reference turbines.

For some robustness to measurement down-time on some turbines, the order of the reference group could be defined in such a way that there are one or more "back-up" turbines used in case a turbine is down or for some other reason not providing a valid measurement. An example is illustrated in the following FIGS. 3, 4 and 5, each showing a respective wind park 300, 400 and 500, respectively.

FIG. 3 illustrates the situation of FIG. 2 showing the candidate wind turbines A03, A02, A01, B01, F02, F07 and B07 of the considered downstream wind turbine B02. In FIG. 4 it is illustrated that the wind turbine A02 may serve as a back-up wind turbine for the wind turbine A03 in case the wind turbine A03 cannot provide a reliable wind determination. In this back-up case the wind turbine A02 also provides the wind determination data if the currently determined wind direction is within the back-up wind direction angle range 114 which had previously been associated as the wind direction angle range 113 for the wind turbine A03. Thus, the neighbouring turbine of the previously selected turbine could be used as a back-up turbine, using the same sector as the original turbine. When including back-up turbines and second back-up turbines (illustrated for example in FIG. 5) (used in case the measurement of the back-up turbine is not available either), the method may further be improved regarding robustness. In the FIG. 5, the wind turbine A03 may serve as a secondary back-up wind turbine for the wind turbine A02 and the wind turbine A01 may serve as a secondary back-up of the wind turbine B01, both having secondary wind direction ranges 116 associated.

FIG. 6 illustrates wind conditions around a wind turbine having rotor disk 120 with rotor blades. Free-stream wind 109 impacts on the rotor disk 120 generating a wake region 122 downstream the rotor disk 120. The disk exerts a force 130 on the wind flow. The wind velocity 124 is at the free-stream level 126 upstream the rotor disk 120, decreases in a region downstream to a minimum and further downstream increases to almost reach the free-stream level 126. Within a space 128 mixing between turbulent air and free-stream wind occurs.

Embodiments of the present invention may provide several advantages:
very little communication between turbines and signal processing needed to establish reference turbine
robustness to measurement down time
smoothness of measurement signals Each of these may contribute to smoothing and availability of measurement signals. Smooth and reliable measurements may be needed for robust wake mitigation control in the wind farm.

According to embodiments of the present invention, locally predefined activation sectors (i.e. wind direction angle ranges) are defined rather than an iterative method is applied, providing e.g.

robustness to measurement down time by using back-up reference turbine
rate-of-change limitation on signal and preventing unnecessary back-up-and-forth switching between reference turbines.

The resulting robust wake mitigation control in the wind farm may improve energy production and/or reduction of mechanical or electrical loads on the wind turbines.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method of estimating free-stream inflow at a downstream wind turbine of a wind park, the method comprising:
selecting, from plural candidate wind turbines previously defined specifically for the downstream wind turbine, an upstream wind turbine based on a currently determined wind direction;
determining, a wind measurement system of the selected upstream wind turbine, the free-stream inflow at the downstream wind turbine by utilizing free-stream inflow at the upstream wind turbine and correcting it with a time delay calculated from the wind speed, wind direction and a distance between the upstream wind turbine and the downstream wind turbine; and
controlling, the rotor speed and/or blade pitch of the downstream wind turbine based on the determined free-stream inflow.

2. The method according to claim 1, wherein the upstream wind turbine is selected such that it is not, according to the currently determined wind direction, in a wake region of any other wind turbine,
wherein the currently determined wind direction is initially determined by the downstream wind turbine and after selecting the candidate wind turbine is determined by the selected candidate wind turbine.

3. The method according to claim 1, wherein to each of the candidate wind turbines a wind direction angle range is associated such that the downstream turbine is arranged downstream of the candidate wind turbine within a cone corresponding to the wind direction angle range, wherein a candidate is selected for which at least a first criterion is satisfied, comprising:
the currently determined wind direction is within the wind direction angle range associated with the selected candidate wind turbine.

4. The method according to claim 3, wherein that candidate wind turbine is selected, if further at least a second criterion is satisfied, comprising:
the selected candidate wind turbine is closer to the downstream wind turbine than all other candidate wind turbines satisfying the first criterion.

5. The method according to claim 1, wherein a union of all wind direction angle ranges cover 360°, wherein at least two wind direction angle ranges overlap, in particular having an overlap of 5° to 20°.

6. The method according to claim 1, further comprising:
determining a wind direction by the selected candidate wind turbine;

checking the first criterion now applied to the wind direction determined by the selected wind turbine as the currently determined wind direction.

7. The method according to claim 6, comprising, if the first criterion is not satisfied for the selected candidate wind turbine:
selecting another upstream wind turbine from the plural candidate wind turbines for which the first criterion, and in particular also the second criterion, is satisfied.

8. The method according to claim 1, wherein the candidate wind turbines are peripheral wind turbines of the wind park, wherein the selected candidate wind turbine is located in an angle range in front of the downstream wind turbine along the wind direction.

9. The method according to claim 1, wherein upon a change of the currently determined wind direction another wind turbine is selected from the candidate wind turbines, such that at least the first criterion satisfied.

10. The method according to claim 1, wherein if the changed wind direction is within an overlap of two wind direction angle ranges, the previously selected candidate wind turbine is maintained as the selected candidate wind turbine.

11. The method according to claim 1, wherein for at least one of the candidate wind turbines a primary backup wind turbine is selected in case the provisionally selected candidate wind turbine does not provide a reliable free-stream inflow determination, the primary backup wind turbine satisfying less stringent criteria than the candidates to be selected, wherein to at least one candidate wind turbine the wind direction angle range and a backup wind direction angle range is associated.

12. The method according to claim 1, wherein controlling the downstream and/or the upstream wind turbine includes:
predicting, using a wake model, a wind condition at the downstream wind turbine based on the free-stream flow and operation conditions of all other wind turbines in front of the downstream wind turbine; and
controlling the downstream and/or the upstream wind turbine based on the predicted wind condition at the downstream wind turbine.

13. An arrangement for estimating free-stream inflow at a downstream wind turbine of a wind park, the arrangement comprising:
a server or wind park controller communicatively connected with the wind turbines configured to compute control signals configured to control a wind turbine, the server or wind park controller adapted to select, from plural candidate wind turbines previously defined specifically for the downstream wind turbine, an upstream wind turbine based on a currently determined wind direction; and
a wind measurement system of the selected upstream wind turbine adapted to determine the free-stream inflow at the downstream wind turbine by utilizing free-stream inflow at the upstream wind turbine and correcting it with a time delay calculated from the wind speed, wind direction and a distance between the upstream wind turbine and the downstream wind turbine,
wherein the server or wind park controller is configured to control the rotor speed and/or blade pitch of the downstream wind turbine based on the determined free-stream inflow.

14. A wind park, comprising:
plural wind turbines including a downstream wind turbine and a plurality of upstream wind turbines that are upstream from the downstream wind turbine; and an arrangement for estimating free-stream inflow communicatively connected to the plural wind turbines, the arrangement comprising:
a server or wind park controller adapted to select, from the plurality of upstream wind turbines, an upstream wind turbine based on a currently determined wind direction; and
a wind measurement system of the selected upstream wind turbine adapted to determine the free-stream inflow at the downstream wind turbine by utilizing free-stream inflow at the upstream wind turbine and correcting it with a time delay calculated from the wind speed, wind direction and a distance between the upstream wind turbine and the downstream wind turbine, wherein the server or wind park controller is configured to control the rotor speed and/or blade pitch of the downstream wind turbine based on the determined free-stream inflow.

* * * * *